United States Patent [19]

Sebastiano et al.

[11] Patent Number: 5,098,792
[45] Date of Patent: Mar. 24, 1992

[54] PROCESS FOR THE MANUFACTURE OF GLASS WITH MODIFIED RADIANT ENERGY CHARACTERISTICS AND THE PRODUCT SO OBTAINED

[75] Inventors: Francesco Sebastiano, Termoli; Liberto Massarelli, Vasto, both of Italy

[73] Assignee: Societa Italiana Vetro - SIV - S.p.A., San Salvo, Italy

[21] Appl. No.: 727,345

[22] Filed: Jul. 8, 1991

Related U.S. Application Data

[60] Continuation of Ser. No. 501,322, Mar. 28, 1990, abandoned, which is a division of Ser. No. 275,569, Nov. 22, 1988, abandoned.

[30] Foreign Application Priority Data

Nov. 27, 1987 [IT] Italy ................ 48645 A/87

[51] Int. Cl.⁵ ............ B05D 3/06; B05D 5/06; B32B 17/06; C03C 15/00
[52] U.S. Cl. ............ 428/426; 428/38; 427/38; 427/165; 65/30.13
[58] Field of Search ........... 427/38, 164, 165; 65/30.11, 30.13; 428/38, 426

[56] References Cited

U.S. PATENT DOCUMENTS

| | | | |
|---|---|---|---|
| 4,262,056 | 4/1981 | Hubler et al. | 427/38 |
| 4,465,337 | 8/1984 | Baron et al. | 427/164 |
| 4,521,443 | 6/1985 | Naik et al. | 427/38 |
| 4,686,162 | 8/1987 | Stangl et al. | 427/38 |
| 4,718,905 | 1/1988 | Freeman | 427/2 |
| 4,855,176 | 8/1989 | Ohwaki et al. | 427/38 |

FOREIGN PATENT DOCUMENTS 1561784 3/1980 United Kingdom .

OTHER PUBLICATIONS

Characterization by Nuclear and Spectrophotometric Analysis of Near-Surface Modifications of Glass Implanted with Heavy Ions, Pietro Polato et al., J. Am. Ceram. Soc., 70 [10] pp. 775-779 (Oct. 1987).
Modification of the surface layers of glasses by ion implantation—vonAlla Deschkowkaja; Glastech, Ber. 59 (1986) #11 p. 326-331.

Primary Examiner—Shrive Beck
Assistant Examiner—M. L. Padgett
Attorney, Agent, or Firm—Wenderoth, Lind & Ponack

[57] ABSTRACT

A process for the manufacture of a glass capable of transmitting and reflecting radiant energy in an amount different from that transmitted and reflected by the original glass is disclosed. An ion implantation of appropriate materials into one or more layers of the glass produces a variation of density in the molecular structure of the layer and consequently a variation of the refractive index. The so obtained glass can be commercially used with no restrictions as to applications where there is contact with the external environment.

2 Claims, 1 Drawing Sheet

PROCESS FOR THE MANUFACTURE OF GLASS WITH MODIFIED RADIANT ENERGY CHARACTERISTICS AND THE PRODUCT SO OBTAINED

This application is a continuation of now abandoned application Ser. No. 501,322, filed on Mar. 28, 1990, which is a divisional of Ser. No. 275,569, filed on Nov. 22, 1988, now abandoned.

BACKGROUND OF THE INVENTION

1. Field of the Invention

The present invention relates to a process for the manufacture of sheets of glass having modified characteristics with respect to transmission and reflection of radiant energy.

The present invention also relates to the product obtained by the process.

The sheets of glass conventionally used in motorcars, aeroplanes, and generically in transportation, as well as in the building field, transmit and reflect an amount of heat and light energy different from that incident on the glass depending on the characteristics of the glass.

These characteristics may be modified by depositing on one or both the outer surfaces, one or more thin layers of appropriate materials, by means of operations known in the art as cathodic sputtering and chemical deposition in a vapour state.

The thin layers externally deposited on the glass show, however, a series of drawbacks. They can be scratched by solid bodies, can be abraded in unfavourable environmental conditions (dust, hail, polluting gases and the like), and their adherence to the substrate can be impaired by chemical incompatibility with the substrate itself or by scarce cleanness. Operating disfunctions in the deposition apparatus can produce, moreover, disuniformity of the layer.

A further disadvantage is that when the outer layers are subjected to a high temperature they show a tendency to detach or crack.

An object of the present invention is to provide a process for the manufacture of glass capable of transmitting and reflecting an amount of radiant energy different from that transmitted and reflected by the original glass.

A further object of the present invention is to provide a sheet of glass having modified energy characteristics and being able to overcome the above mentioned disadvantages.

2. Description of the Prior Art

A method of ion implantation to obtain a modification of a surface is well known.

By this method it is possible to obtain in the treated materials, mechanical, electrical, optical, chemical and physical characteristics different from the original characteristics, with the object of improving such characteristics or obtaining new alloys having certain properties.

A detailed description can be found in the text "Ion Implantation and Beam Technology" by J. S. Williams and J. M. Poate, issued by the Academic Press.

In the production technology of microelectronics, a high energy ion implantation method is presently used, in which the ions are capable of penetrating to a depth of several micrometers below the surface in contact with the external surface of the silicon substrate, on which the microcircuits are built.

By this method it is possible, by implantation of oxygen ions for instance, to obtain electrically insulated layers submerged into silicon and successively, by doping the silicon at a lower depth, to obtain conducting layers. In this manner microcircuits can be built inside the silicon substrate rather than outside. The microcircuits thus obtained are usually denominated "buried microcircuits".

A method of ion implantation for obtaining buried multilayer filters has been described in U.S. Pat. No. 4,262,056. This document teaches that an implantation of nitrogen into silicon at a temperature between 600° and 1000° C., produces layers of $Si_2N_4$ at different levels, interleaved by pure silicon layers.

In this manner the creation of a new material is effected in the layer which has undergone implantation, which consequently shows a refractive index different from that of the original material.

This filter can, however, only be used in the infrared range, being in any case opaque to white light.

SUMMARY OF THE INVENTION

It has been now surprisingly found, and this is an object of the present invention, that the ion implantation technology can be advantageously used for the manufacture of sheets of glass capable of transmitting and reflecting appropriate amounts of energy, having any wave-length, different from that originally transmitted and reflected, to be used in transportation apparatus and/or in the building field and/or in the optical industry.

In particular it has been found according to the invention that an ion implantation into internal layers of the glass causes the ions to be inserted in the molecular structure of these layers, of which the density is modified, thus modifying the refractive index.

The advantages of the process according to the present invention essentially consists in that as the layers having a modified refractive index are "buried" into the glass, they are altogether insensitive to any damage due to external sources and can consequently be used in all conditions.

An object of the present invention is consequently a process for the manufacture of a sheet of glass capable of transmitting and reflecting an appropriate amount of energy, different from that transmitted and reflected by the original glass, which can advantageously be used in transportation apparatus and/or in the building field and/or in the optical industry, characterized in that the modification of the energy transmitted and/or reflected by the glass is obtained by implanting into the molecular structures of one or more internal layers of the glass ions of elements which do not react with the elements forming the original glass itself.

A further object of the present invention is a sheet of glass capable of transmitting and reflecting an appropriate amount of the incident energy, characterized in that it has one or more internal layers in which the molecular density is modified with respect to that of the original glass.

BRIEF DESCRIPTION OF THE DRAWINGS

The features of the invention will be better illustrated referring to the accompanying drawings, in which.

DESCRIPTION OF THE PREFERRED EMBODIMENTS

Figure 1:
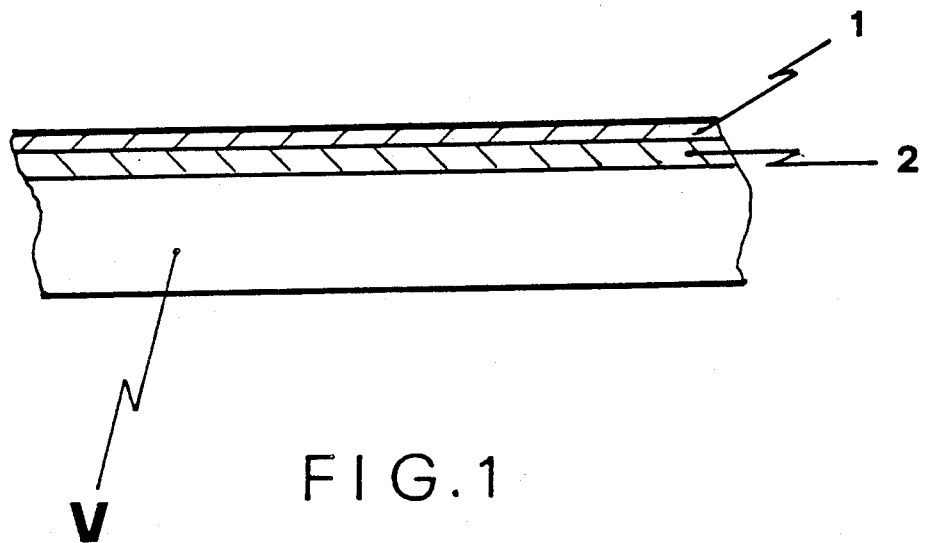
FIGS. 1 and 2 show glass on which the process of the invention has been applied.
Figure 2:
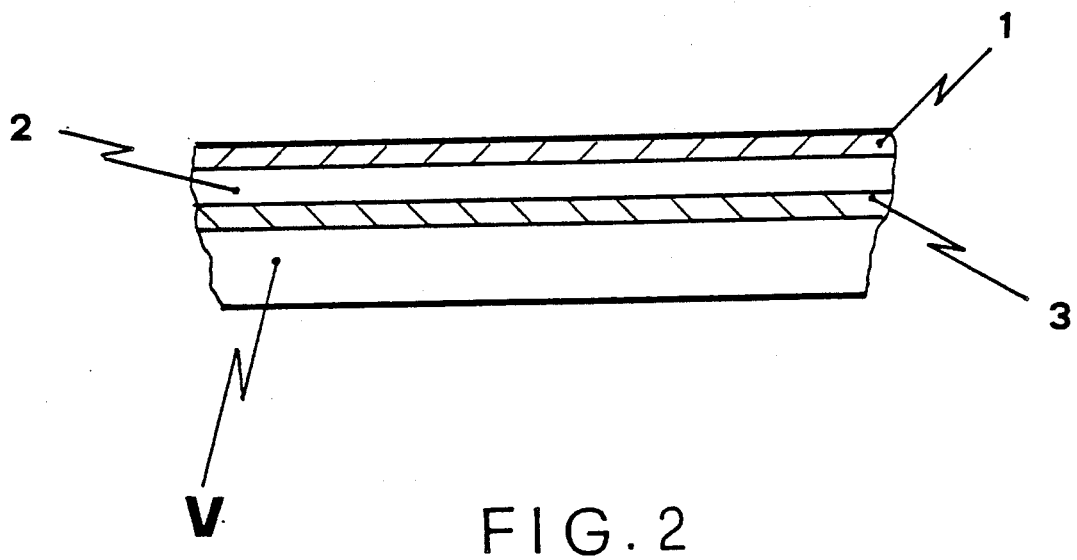

Referring to FIGS. 1 and 2, layers which have various refractive indices are produced in the glass V by ion implantation within its thickness.

The process is carried out by means of an apparatus for ion implantation capable of providing the ions with a sufficiently high energy, such as the apparatus EATON 1003, which can provide the ions with an energy up to 6 MeV.

It is thus possible to select the refractive index of the implanted glass on the basis of the glass type and the ion type. In fact, argon, xenon, krypton, neon, and helium ions can be advantageously implanted into layers "buried" in the glass.

Ions of any other element can also be advantageously implanted, provided that temperature and pressure conditions are used such that they do not react with the elements of the glass composition.

Further modifications of the energy transmission can be obtained by acting on the number of "buried" layers on which the ion implantation is effected. A variation in the combination of the number of layers and the type of ions will obviously produce variations of the energy characteristics of the glass.

It can be understood that the invention as previously described can be embodied in any form falling within the scope of the invention.

EXAMPLE 1

Following the process of the invention a sheet of glass can be manufactured having a very low energy reflection, i.e. an antireflective glass.

Referring to FIG. 1, on a sodium calcium glass V, having a refractive index 1.52 measured as an average value of the values obtained for wavelengths of white light, and an energy reflection 7%, a nitrogen ion implantation has been effected into the layer 2 by using an implantation apparatus capable of providing the ions with an energy of 270 keV and a dose of $1 \times 10^{17}$ ions/cm$^2$ through an effective thickness of 0.469 micrometers. Successively, an argon ion implantation was effected into the layer 1 at an energy of 70 keV and a dose of $0.8 \times 10^{17}$ ions/cm$^2$ through a depth of 0.186 micrometers.

During the implantation the glass temperature was 525° C.

With this treatment a refractive index of 1.343 was obtained for the layer 1, whereas the layer 2 had a refractive index of 1.660.

It was found that the glass thus obtained showed, at a wavelength of 1 micrometer, an energy reflection very near to zero.

EXAMPLE 2

A glass which shows an increase of its energy reflection can be manufactured.

Referring to FIG. 2, on a sodium calcium glass V having an energy reflection 7% and a refractive index 1.52, measured as an average value of the values obtained at wave lengths of white light, a nitrogen and carbonium implantation was effected on the layer 3, at a ratio of 85:15 with an energy 270 keV and a dose $1 \times 10^{17}$ ions/cm$^2$ through a thickness of 0.234 micrometers.

No implantation was effected on the layer 2 at 0.186 micrometers thickness. Successively, on the layer 1 a nitrogen and carbonium ion implantation was effected in a ratio 85:15 with a 100 keV energy and a dose of $1 \times 10^{17}$ ions/cm$^2$ through a depth of 0.234 micrometers. The glass temperature was about 350° C. A glass was thus obtained showing a maximum energy reflection of 15.9% at a 1 micrometer wavelength.

We claim:

1. A sheet of soda-lime glass for use as a window in a building or a vehicle with a refractive index of about 1.52 as an average for wavelengths of white light and an energy reflection of about 7%, having a first layer with a refractive index of about 1.343 containing argon ions implanted at a glass temperature of about 525° C. with an energy of about 70 KeV at a dose of about $0.8 \times 10^{17}$ ions/cm$^2$ through a thickness of the layer of about 0.186 μm, and a second layer with a refractive index of about 1.68 underneath said first layer containing nitrogen ions implanted at a glass temperature of about 525° C. with an energy of about 270 KeV at a dose of about $1 \times 10^{17}$ ions/cm through a thickness of the layer of about 0.469 μm.

2. A sheet of soda-lime glass with an energy reflection of about 7% and a refractive index of about 1.5 as an average for wavelengths of white light having a first layer containing nitrogen and carbonium ions in a ratio of 85:15 implanted at a glass temperature of about 350° C. with an energy of about 100 KeV at a dose of about $1 \times 10^{17}$ ions/cm$^2$ through a thickness of the layer of about 0.234 μm, a second layer underneath said first layer free of implanted ions having a thickness of about 0.136 μm, and a third layer underneath said second layer containing nitrogen and carbonium ions in a ratio 85:15 implanted with a glass temperature of about 350° C. with an energy of about 270 KeV at a dose of about $1 \times 10^{17}$ ions/cm$^2$ through a thickness of the layer of about 0.234 μm, said glass having a maximum energy reflection of about 15.9% at 1 μm wavelength.

* * * * *